Patented Feb. 26, 1952

2,586,887

UNITED STATES PATENT OFFICE 2,586,887

BENZILMONOHYDRAZON BLOWING-AGENT FOR PREPARING POROUS THERMOPLASTIC RESINS

Georgette van Gaver, Lyon, France, assignor to Societe Anonyme des Manufactures des Glaces et Produits Chimiques de Saint-Gobain, Chauny & Cirey, Paris, France No Drawing. Application September 28, 1948, Serial No. 51,658

14 Claims. (Cl. 260—2.5)

This invention relates to new resinous compositions of matter, to articles made therefrom, and to the processes of making the new resins and the new articles. The invention is concerned with thermoplastic resins and particularly with thermoplastic resins that become plastic at about 145 degrees C. The utility of polyvinyl chloride, polyvinyl acetate, and polyvinylidene chloride and their different copolymers is noted.

It has been proposed heretofore to prepare porous plastic masses by mixing with such masses in powder form an agent capable of liberating a gas under the action of heat. Such plastic masses may contain plasticizers, pigments, dyes, and inert ingredients. In practicing that prior art process, the mixtures are introduced to a metallic mold which is heated to a temperature sufficient to produce a homogeneous mass without at the same time decomposing the gas yielding compound. The material thus homogenized may thereafter be transformed to a porous plastic mass by simply heating in free air at a temperature sufficient to decompose the agent. However, the necessity of preventing premature decomposition of the gas producing compound during molding or more generally during the homogenization of the material frequently necessitates operating the homogenization at very high pressure. This is particularly true when one is concerned with vinyl polymers such as polyvinyl chloride, polyvinylidene chloride, or with their copolymers with other polymerizable substances. The pressure required may be 200–300 kg./sq. cm. or more.

These difficulties of the prior art are notable when the objects made are of very small dimensions, but they become of great magnitude when the process is applied to pieces of larger size. It then becomes necessary to use extremely powerful presses and molds which are costly to make and difficult to construct. Especially, these processes do not permit continuous operations or at least do not permit such operations without encountering technical difficulties of considerable magnitude.

The compositions which have been used heretofore for the production of gases within such bodies have been nitrogenous in nature to a considerable extent, and it has been an unfortunate characteristic of such compouds that the gases generated leave in the plastic mass residues that are toxic, which is a great inconvenience.

It is an object of this invention to prepare porous masses by the generation of gases within thermoplastic materials in a plastic condition under conditions which are generally at ordinary temperature and pressure which do not require the employment of high pressures or expensive apparatus, and with the production of products which are non-toxic.

The objects of the invention are accomplished, generally speaking, by generating gas within plastic masses by means of the product resulting from the reaction of benzil on hydrazine hydrate. Benzil, $C_6H_5COCOC_6H_5$, produces, upon reaction with hydrazine hydrate $N_2H_4H_2O$, a product the constitution of which is not too well known, but which has been described by Wieland "Die Hydrazine (1913) page 96 under the name benzilmonohydrazon, and contains benzoyl-phenyl-hydrazino-methylene." Whatever its constitution may be, I have shown that this product offers great advantages in the production of porous plastic materials. It decomposes at a temperature of about 160 degrees C. with the liberation of non-toxic gases and the production of non-toxic residues. The use of a press during the homogenization or working up of the plastic material is usually unnecessary and particularly if the temperature employed during this phase of the operation does not exceed 135–145 degrees C., at which temperatures most thermoplastic materials are sufficiently plastic to be worked satisfactorily, and at those temperatures the reaction product of this invention does not decompose. This is true, for example, in the case of plasticized polyvinyl chloride which can be homogenized on a roll mill at about 135–140 degrees C., particularly when the content of plasticizer is above 15%. In the case of the copolymers of vinyl chloride and vinyl acetate the temperature of homogenization is even lower. When the working up of the plastic has been completed, it can be rendered porous by the simple expedient of heating to 160 degrees C. at ordinary pressure, the gas being liberated at that temperature and filling the plastic mass with pores of uniform size and distribution. Of course, in heating bodies of considerable thickness care should be taken that the body is heated to the requisite temperature of decomposition all the way through.

The process permits very great ease and facility of manufacture and among the products that can be made by this process are: porous sheets of plastic material, or tissues in single or multiple layers, or porous sheets attached to solid sheets. In particular it is possible to attach to a plane or curved surface, a product that can be made porous after the attachment. Larger, spongy masses are produced by incorporating the said reaction product into masses of greater thickness and heating the masses through while in a plastic state.

There are hereafter given practical instructions for carrying out the invention, the instructions being representative and not limitative.

The gas producing agent may be prepared by the action of hydrazine hydrate on benzil in alcoholic solution at the boiling temperature of the alcohol, the reaction taking 10 minutes or so. The solution is cooled to about 5 degrees C. after the reaction in order to precipitate the condensation product, and is filtered and washed with cold alcohol. The yield should be about 93%. The product melts at 148 degrees C. and decomposes at about 150-160 degrees C. With the quantitative liberation of nitrogen, the residue of this decomposition is presumably constituted by benzyl phenyl ketone which is of lemon yellow color and is not toxic.

In order to employ the said reaction product for the liberation of gas in a plastic mass, it is mingled uniformly with the mass, or alternatively is limited to mixing with that portion of the mass which is to be porous, and the mass is then heated to the temperature at which the said reaction product decomposes.

As an example, 65 parts of polyvinyl chloride powder are mixed with ½ part of aluminum stearate, 35 parts of tricresyl phosphate and 15 parts of the reaction product of benzil and hydrazine hydrate. This mixture is made in any kind of a receptacle and is homogenized on a roll mill at a temperature of 145 degrees C. for 10 to 20 minutes, during which time there is produced a sheet of perfectly homogeneous plasticized polyvinyl chloride which does not contain any traces of bubbles and cannot be distinguished from similar sheets that do not contain gas producing agent. This sheet is then calendered at a convenient temperature so as to obtain a sheet of uniform thickness of .4 millimeter, for example, which is perfectly homogeneous. This sheet is then heated to about 160 degrees C. by a stove or by infra red light or by means of high frequency current, or by any other means, during which the gas liberating agent decomposes within the plastic mass. The thickness of this mass increases about 10 times and it presents the appearance of a micro-porous sheet of lemon yellow color having pores which are very uniform.

In an alternative method of proceeding the sheet issuing from the calender is applied to a woven fabric by means of a calender of lapping machine type whereby the fabric and the plastic are united. After heating at 160 degrees C. in a drier tunnel or any other heating means, there is produced a fabric covered with a porous coating of plasticized polyvinyl chloride which is of major interest because of its thermal and sound insulating properties.

The invention is not limited to employment with polyvinyl chloride and its copolymers or to vinyl compounds and their copolymers, but is equally applicable to all thermoplastic compounds which can be plasticized at a temperature below that at which the reaction product of hydrazine hydrate and benzil decomposes. For instance, analogous results are obtained by the use of plastics of polyvinylidene base and of the copolymers of polyvinylidene compounds, the temperature of homogenization of which does not ordinarily exceed 140 degrees C. In many of these cases where the temperature of homogenization of the plastic itself would exceed 140-145 degrees C. it can be lowered by the employment of adequate quantities of an ordinary plasticizer. Thus, in the case of polyvinylidene chloride, 30% of plasticizer is useful for this purpose. The presence of considerable quantities of plasticizer not only affects the plasticity of the compound under heat, but aids in the expansion of the mass during the gas-producing phase of the process.

As many apparently widely different embodiments of the present invention may be made without departing from the spirit and scope thereof, it is to be understood that the invention is not limited to the specific embodiments.

What is claimed is:

1. A thermoplastic resin, plastic at 145 degrees C., containing benzilmonohydrazon.

2. A vinyl resin, plastic at 145 degrees C., containing benzilmonohydrazon.

3. A resinous composition comprising vinyl chloride, which composition is plastic at 145 degrees C. and contains benzilmonohydrazon.

4. Polyvinyl chloride containing benzilmonohydrazon.

5. Polyvinyl acetate containing benzilmonohydrazon.

6. An article having a base, and attached thereto a layer composed of thermoplastic resin plastic at 145 degrees C. containing benzilmonohydrazon.

7. A process of making a porous article that includes the steps of incorporating in a thermoplastic resin plastic at about 145 degrees C. benzilmonohydrazon, and heating the article to the temperature of decomposition of said product.

8. A process of making a porous article that includes the steps of incorporating in a thermoplastic resin plastic at about 145 degrees C. benzilmonohydrazon, and heating the article to about 160 degrees C.

9. The process of making a porous article that includes the steps of incorporating in a polyvinyl resin plastic at about 145 degrees C. benzilmonohydrazon, and heating the article to the temperature of decomposition of said product.

10. The method of making an article that includes the steps of adhesively joining a thermoplastic resin containing benzilmonohydrazon to another body, and heating the article to a temperature below the decomposition point of the resin and said body and above that of said reaction product.

11. The method of making an article that includes the step of incorporating benzilmonohydrazon in a thermoplastic resin that is plastic and adhesive at about 145 degrees C., making the resin plastic and adhesive by heating to 145 degrees C., sticking the resin on another body, and heating the resin to 160 degrees C. to decompose the reaction product.

12. The method of preparing insulating material that includes the steps of joining a woven material to a sheet of thermoplastic material containing benzilmonohydrazon, and heating the product to the temperature of decomposition of the said reaction product.

13. A porous insulating body composed of a fabric support coated with a porous thermoplastic material containing benzyl phenyl ketone in the pores formed by the thermal decomposition of benzilmonohydrazon within the thermoplastic material.

14. A porous thermoplastic material containing benzyl phenyl ketone formed by the thermal decomposition of benzilmonohydrazon within the thermoplastic material.

GEORGETTE VAN GAVER.

REFERENCES CITED

The following references are of record in the file of this patent:

UNITED STATES PATENTS

| Number | Name | Date |
|---|---|---|
| 2,394,689 | Heyman | Feb. 12, 1946 |

OTHER REFERENCES

Lange: "Handbook of Chemistry," 4th ed., pages 245, 6 (1941).

Chem. & Met. Engr. (February 1946), page 216.

H. Wieland, Die Hydrazine (1913), page 96.